United States Patent [19]

Hoffman et al.

[11] 3,917,751

[45] Nov. 4, 1975

[54] THIONO-PHOSPHORIC(PHOSPHONIC) ACID ESTER FORMALDOXIMES

[75] Inventors: Hellmut Hoffman, Wuppertal-Elberfeld; Wolfgang Behrenz, Cologne-Stammheim; Ingeborg Hammann, Cologne, all of Germany

[73] Assignee: Bayer Aktiengesellschaft, Leverkusen, Germany

[22] Filed: Oct. 5, 1971

[21] Appl. No.: 186,815

[30] Foreign Application Priority Data
Oct. 13, 1970  Germany............................ 2050090

[52] U.S. Cl.................................. 260/940; 424/210
[51] Int. Cl.².... A01N 9/36; C07F 9/165; C07F 9/40
[58] Field of Search..................................... 260/940

[56] References Cited
UNITED STATES PATENTS
3,591,662   7/1971   Lorenz et al........................ 260/940
3,639,537   2/1972   Kaufman............................ 260/940

OTHER PUBLICATIONS
Fine Chemicals Patents Journal, 7, No. 21, German 5:2 (5–31–67).

Primary Examiner—Richard L. Raymond
Attorney, Agent, or Firm—Burgess, Dinklage & Sprung

[57]  ABSTRACT

Thiono-phosphoric(phosphonic) acid ester formaldoximes of the general formula

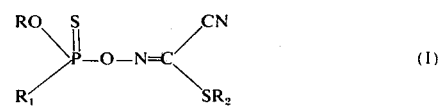

in which
R and $R_2$ each is an alkyl radical with 1–6 carbon atoms, and
$R_1$ is an alkyl or alkoxy radical with 1–6 carbon atoms, which possess insecticidal, acaricidal and fungicidal properties.

7 Claims, No Drawings

THIONO-PHOSPHORIC(PHOSPHONIC) ACID ESTER FORMALDOXIMES

The present invention relates to and has for its objects the provision of particular new thiono-phosphoric (phosphonic) acid ester formaldoximes, i.e. O,O-dialkyl-O-(1-cyano-1-alkylmercaptoformaldoxime)-thiono-phosphoric acid esters and O-alkyl-O-(1-cyano-1-alkylmercaptoformaldoxime)-alkane-thiono-phosphonic acid esters, which possess insecticidal, acaricidal and fungicidal properties, active composition in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from German Published Specifications 1,238,902 and 1,009,181 that thionophosphoric acid ester benzaldoximes, such as O,O-diethyl-O-($\alpha$-cyanobenzaldoxime)-thionophosphoric acid ester (Compound A), and dialkyl-(1,2-dialkoxycarbonylalkyl)-dithiophosphates, such as O,O-dimethyl-S-(1,2-dicarbethoxyethyl)-dithiophosphoric acid ester, exhibit insecticidal activity.

The present invention provides, as new compounds, the thionophosphoric(phosphonic) acid ester formaldoximes of the general formula

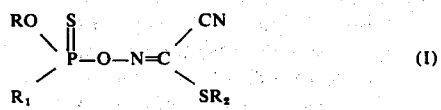

(I)

in which
R and $R_2$ each is an alkyl radical with 1–6 carbon atoms, and
$R_1$ is an alkyl or alkoxy radical with 1–6 carbon atoms.

These new compounds have been found to exhibit strong insecticidal, acaricidal and fungicidal activity.

The present invention also provides a process for the preparation of a compound of the formula (I) above, in which a formaldoxime derivative of the general formula

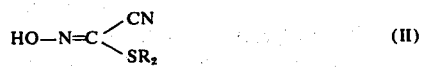

(II)

is reacted, in the form of an alkali metal, alkaline earth metal or ammonium salt thereof or in the presence of an acid-binding agent, with a thionophosphoric(phosphonic) acid ester halide of the general formula

(III), in which formulas
R, $R_1$ and $R_2$ have the meanings stated above, and
Hal is a halogen atom, preferably a chlorine atom.

Surprisingly, the thionophosphoric(phosphonic) acid ester formaldoximes according to the invention possess a substantially better insecticidal and acaricidal activity than the known thionophosphoric acid ester benzaldoximes of analogous constitution and of the same directions of activity; moreover, they are also superior as regards activity to the known O,O-dimethyl-S-(1,2-dicarbethoxyethyl)-dithiophosphoric acid ester. The compounds according to the invention therefore represent a genuine enrichment of the art.

If O,O-diethylthionophosphoric acid ester chloride and 1-cyano-1-methylmercaptoformaldoxime are used as starting materials, the reaction course can be represented by the following equation:

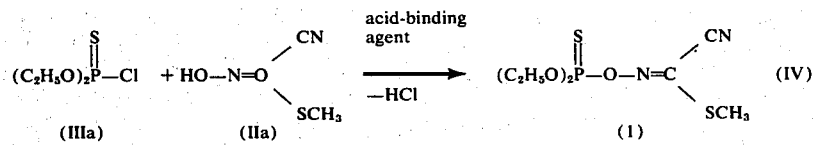

Preferably, in formulas (I), (II) and (III), R, $R_1$ and $R_2$ each is a lower alkyl radical with 1-4 carbon atoms, namely methyl, ethyl, n- or isopropyl or n-, sec.-, tert.- or isobutyl, $R_1$ alternatively being a lower alkoxy radical with 1–4 carbon atoms.

As examples of the thionophosphoric(phosphonic) acid ester halides which can be used, there are mentioned:
O,O-dimethyl-, O,O-diethyl-, O,O-dipropyl-, O,O-diisopropyl-, O-methyl-O-ethyl-, O-methyl-O-isopropyl-, O-ethyl-O-isopropyl-, O,O-dibutyl-, O-methyl-O-butyl and O-isopropyl-O-butyl-thionophosphoric acid ester chlorides; and
O-methyl-methane-, O-ethyl-propane-, O-isopropylethane-, O-butyl-methane-, O-methyl-isopropane-, O-methyl-ethane-, O-ethyl-ethane-, O-propylmethane, O-butyl-ethane-, O-methyl-butane-, O-ethyl-isopropane-, O-butyl-isopropane and O-butyl-butane-thionophosphonic acid ester chlorides.

The thionophosphoric(phosphonic) acid ester halides are known and can be prepared according to customary methods, as can the 1-cyanoformaldoximes. The latter can, for example, be prepared from the reaction of alkylmercaptans and chloro-acetonitrile in the presence of alkali metal alcoholates, followed by oximation with ethylnitrite.

The process is preferably carried out with the use of suitable solvents or diluents. As such, practically all inert organic solvents are suitable, especially aliphatic and aromatic optionally chlorinated hydrocarbons, such as benzene, toluene, xylenes, benzine, methylene chloride, chloroform, carbon tetrachloride and chlorobenzene; ethers, such as diethyl ether, dibutyl ether and dioxane; ketones, for example acetone and methylethyl, methyl-isopropyl and methylisobutyl ketones; and nitriles, such as acetonitrile and propionitrile.

As acid-binding agents, all customary acid-acceptors are suitable. Particularly good results have been obtained with alkali metal carbonates and alcoholates, such as sodium and potassium carbonates, methylates and ethylates, as well as with aliphatic, aromatic and heterocyclic amines, for example triethylamine, dimethylamine, dimethylaniline, dimethylbenzylamine and pyridine.

The reaction temperature can be varied within a fairly wide range. In general the work is carried out at from about 0° to 120°C, preferably at from about 40° to 55°C.

The reaction is, in general, carried out at normal pressure.

In the process, the starting materials are, in most cases, used in equimolar amounts; an excess of one or the other of the reactants brings no substantial advantages. The reaction is preferably carried out in the presence of one of the above-mentioned solvents and of an acid-acceptor, within the stated temperature range; after several hours' stirring, the reaction mixture is worked up by any usual method.

The substances according to the invention are obtained in most cases in the form of colorless or colored, viscous, water-insoluble oils, which cannot be distilled without decomposition but can, by so-called "slight distillation", that is by prolonged heating at moderately elevated temperatures under reduced pressure, be freed from the last volatile components and in this way be purified.

For their characterization, their refractive indexes are especially useful.

As already mentioned, the new thionophosphoric (phosphonic) acid ester formaldoximes are characterized by an outstanding insecticidal and acaricidal effectiveness against crop pests, pests harmful to health and pests of stored products. They possess a good activity against both sucking and biting insects, and mites (Acarina), whereas they exhibit only a low phytotoxicity. They also possess fungicidal properties, especially against phytopathogenic soil fungi.

For these reasons, the compounds according to the invention may be used with succes as pesticides in crop protection and the protection of stored goods, as well as in the hygiene field.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and Nephotettix bipunctatus; and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*): further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (*Coleoptera*), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenbrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acarina) contemplated herein there are classed, in particular, the spider mites (Tetranychidae) such as the two-spotted spider mite (*Tetranychus telarius = Tetranychus althaea* or *Tetranychus urticae*) and the European red mite (*Paratetranychus pilosus = Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against pests harmful to health and pests of stored products, particularly flies and mosquitoes, the compounds of this invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspension, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purposeP aerosol propellants which are gaseous at normal temperatures and pressures, such as freon; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum or mineral oil fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.) sulfoxides (e.g. dimethyl sulfoxide, etc.), ketones (e.g. acetone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides and fungicides or bactericides, nematocides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5–90% by weight, of the mixture, whereas carrier composition mixtures suitable for direct application or field application generally contemplate those in which the active compound is present in an amount substantially between about 0.0001 and 10%, preferably 0.01–1%, by weight of the mixture.

Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001 and 95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of (a) such insects, (b) such acarids, and (c) the corresponding habitat thereof, i.e. the locus to be protected, a correspondingly combative or toxic amount, i.e. an insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, than the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples.

EXAMPLE 1

$LT_{100}$ test for Diptera

Test insects: *Musca domestica*

Solvent: acetone 2 parts by weight of active compound are dissolved in 1000 parts by volume of solvent. The solution so obtained is diluted with further solvent to the desired lower concentrations.

2.5 ml of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used.

About 25 test insects are then placed in the Petri dish and it is covered with a glass lid.

The condition of the test insects is periodically observed. The time which is necessary for a 100% destruction is determined.

The test insects, the active compounds, the concentrations of the active compounds and the periods of time at which there is a 100% destruction can be seen from the following Table 1.

Table 1

(LT$_{100}$ test for Diptera)

| Active compound | Concentration of active compound in the solution in % | LT$_{100}$ |
|---|---|---|
| (A) C$_6$H$_5$—C(CN)=N—O—P(S)(OC$_2$H$_5$)$_2$ (known) | 0.2<br>0.04<br>0.008 | 60'<br>90'<br>>8$^h$ |
| (1) (C$_2$H$_5$O)$_2$P(S)—O—N=C(CN)(SCH$_3$) | 0.2<br>0.04<br>0.008 | 30'<br>75'<br>120' |
| (2) (C$_2$H$_5$O)$_2$P(S)—O—N=C(CN)(SC$_2$H$_5$) | 0.2<br>0.04<br>0.008 | 30'<br>60'<br>180' |
| (3) (CH$_3$O)$_2$P(S)—O—N=C(CN)(SC$_2$H$_5$) | 0.2<br>0.04<br>0.008<br>0.0016 | 30'<br>30'<br>75'<br>4$^h$ |
| (4) (CH$_3$O)$_2$P(S)—O—N=C(CN)(SC$_3$H$_7$—i) | 0.2<br>0.04<br>0.008 | 30'<br>45'<br>180' |
| (5) (CH$_3$O)$_2$P(S)—O—N=C(CN)(SC$_3$H$_7$—n) | 0.2<br>0.04<br>0.008 | 30'<br>45'<br>210' |
| (6) (C$_2$H$_5$O)(C$_2$H$_5$)P(S)—O—N=C(CN)(SCH$_3$) | 0.2<br>0.04<br>0.008<br>0.0016 | 30'<br>30'<br>75'<br>4$^h$ |
| (7) (iC$_3$H$_7$O)(CH$_3$)P(S)—O—N=C(CN)(SC$_3$H$_7$—n) | 0.2<br>0.04<br>0.008 | 30'<br>75'<br>210' |
| (8) (C$_2$H$_5$O)(C$_2$H$_5$)P(S)—O—N=C(CN)(SC$_3$H$_7$—n) | 0.2<br>0.04<br>0.008 | 30'<br>60'<br>150' |
| (9) (C$_2$H$_5$O)(C$_2$H$_5$)P(S)—O—N=C(CN)(SC$_3$H$_7$—i) | 0.2<br>0.04<br>0.008<br>0.0016 | 30'<br>60'<br>90'<br>8$^h$ |
| (10) (C$_2$H$_5$O)(C$_2$H$_5$)P(S)—O—N=C(CN)(SC$_2$H$_5$) | 0.2<br>0.04<br>0.008 | 30'<br>60'<br>105' |

EXAMPLE 2

LT$_{100}$ test for Diptera

Test insects: *Aedes aegypti*

Solvent: acetone 2 parts by weight of active compound are dissolved in 1000 parts by volume of solvent. The solution so obtained is diluted with further solvent to the desired lower concentrations.

2.5 ml of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is periodically observed. The time which is necessary for a 100% destruction is determined.

The test insects, the active compounds, the concentrations of the active compounds and the periods of time at which there is a 100% destruction can be seen from the following Table 2.

Table 2

(LT$_{100}$ test for Diptera)

| Active compound | Concentration of active compound of the solution in % | LT$_{100}$ |
|---|---|---|
| (A) C$_6$H$_5$—C(CN)=N—O—P(S)(OC$_2$H$_5$)$_2$ (known) | 0.2<br>0.04<br>0.008<br>0.0016 | 60'<br>75'<br>105'<br>5$^h$ |
| (1) (C$_2$H$_5$O)$_2$P(S)—O—N=C(CN)(SCH$_3$) | 0.2<br>0.04<br>0.008<br>0.0016 | 30'<br>30'<br>60'<br>150' |
| (2) (C$_2$H$_5$O)$_2$P(S)—O—N=C(CN)(SC$_2$H$_5$) | 0.2<br>0.04<br>0.008<br>0.0016 | 30'<br>45'<br>75'<br>210' |
| (3) (CH$_3$O)$_2$P(S)—O—N=C(CN)(SC$_2$H$_5$) | 0.2<br>0.04<br>0.008<br>0.0016<br>0.00032 | 30'<br>30'<br>60'<br>120'<br>180' |
| (4) (CH$_3$O)$_2$P(S)—O—N=C(CN)(SC$_3$H$_7$—i) | 0.2<br>0.04<br>0.008<br>0.0016<br>0.00032 | 30'<br>30'<br>60'<br>105'<br>6$^h$ |
| (6) (C$_2$H$_5$O)(C$_2$H$_5$)P(S)—O—N=C(CN)(SCH$_3$) | 0.2<br>0.04<br>0.008<br>0.0016<br>0.00032 | 30'<br>45'<br>45'<br>90'<br>5$^h$ |
| (10) (C$_2$H$_5$O)(C$_2$H$_5$)P(S)—O—N=C(CN)(SC$_2$H$_5$) | 0.2<br>0.04<br>0.008<br>0.0016<br>0.00032 | 30'<br>30'<br>75'<br>105'<br>210' |

Table 2-continued (LT$_{100}$ test for Diptera)

| Active compound | Concentration of active compound of the solution in % | LT$_{100}$ |
|---|---|---|
| (9) $C_2H_5O$-P(=S)-O-N=C(CN)(SC$_3$H$_7$-i) / $C_2H_5$ | 0.2<br>0.04<br>0.008<br>0.0016 | 30'<br>45'<br>75'<br>180' |
| (7) $iC_3H_7O$-P(=S)-O-N=C(CN)(SC$_3$H$_7$-n) / CH$_3$ | 0.2<br>0.04<br>0.008<br>0.0016<br>0.0016 | 30'<br>30'<br>60'<br>150'<br>150' |

EXAMPLE 3

LT$_{100}$ test for cockroaches

Test insects: *Blatta orientalis* (females)
Solvent: acetone 2 parts by weight of active compound are dissolved in 1000 parts by volume of solvent. The solution so obtained is diluted with further solvent to the desired lower concentrations.

2.5 ml of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 10 test insects are then placed in the Petri dish and it is covered with a glass lid.

The condition of the test insects is continuously observed for up to 8 hours, and then once after 24 hours. The time which is necessary for a 100% knock down effect is determined.

The test insects, the active compounds, the concentration of the active compounds and the periods of time at which there is a 100% knock down effect can be seen from the following Table 3:

Table 3

(LT$_{100}$ test for cockroaches)

| Active compound | Concentration of active compound of the solution in % | LT$_{100}$ |
|---|---|---|
| (A) C$_6$H$_5$-C(CN)=N-O-P(=S)(OC$_2$H$_5$)$_2$ (known) | 0.2<br>0.04 | 24$^h$<br>24$^h$ |
| (6) $C_2H_5O$-P(=S)-O-N=C(CN)(SCH$_3$) / $C_2H_5$ | 0.2<br>0.04 | 180'<br>6$^h$ |
| (10) $C_2H_5O$-P(=S)-O-N=C(CN)(SC$_2$H$_5$) / $C_2H_5$ | 0.2<br>0.04 | 120'<br>8$^h$ |

EXAMPLE 4

LT$_{100}$ test

Test insects: *Sitophilus granarius*
Solvent: actone 2 parts by weight of active compound are dissolved in 1000 parts by volume of solvent. The solution so obtained is diluted with further solvent to the desired lower concentrations.

2.5 ml of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is continuously observed for up to 8 hours. The time which is necessary for a 100% knock down effect is determined.

The test insects, the active compounds, the concentrations of the active compounds and the periods of time at which there is a 100% knock down effect can be seen from the following Table 4:

Table 4

(LT$_{100}$ test)

| Active compound | Concentration of active compound of the solution in % | LT$_{100}$ |
|---|---|---|
| (A) C$_6$H$_5$-C(CN)=N-O-P(=S)(OC$_2$H$_5$)$_2$ (known) | 0.2<br>0.04<br>0.008 | 180'<br>210'<br>8$^h$ |
| (3) (CH$_3$O)$_2$P(=S)-O-N=C(CN)(SC$_2$H$_5$) | 0.2<br>0.04<br>0.008 | 60'<br>105'<br>210' |
| (5) (CH$_3$O)$_2$P(=S)-O-N=C(CN)(SC$_3$H$_7$-n) | 0.2<br>0.04<br>0.008 | 120'<br>120'<br>4$^h$ |
| (4) (CH$_3$O)$_2$P(=S)-O-N=C(CN)(SC$_3$H$_7$-i) | 0.2<br>0.04<br>0.008 | 105'<br>150'<br>5$^h$ |
| (6) $C_2H_5O$-P(=S)-O-N=C(CN)(SCH$_3$) / $C_2H_5$ | 0.2<br>0.04<br>0.008 | 75'<br>120'<br>4$^h$ |
| (10) $C_2H_5O$-P(=S)-O-N=C(CN)(SC$_2$H$_5$) / $C_2H_5$ | 0.2<br>0.04<br>0.008 | 75'<br>105'<br>6$^h$ |
| (8) $C_2H_5O$-P(=S)-O-N=C(CN)(SC$_3$H$_7$-n) / $C_2H_5$ | 0.2<br>0.04<br>0.008 | 90'<br>150'<br>6$^h$ |
| (9) $C_2H_5O$-P(=S)-O-N=C(CN)(SC$_3$H$_7$-i) / $C_2H_5$ | 0.2<br>0.04<br>0.008 | 90'<br>150'<br>210' |

EXAMPLE 5

LD$_{100}$ test
Test insects: *Ornithodoros moubata* (3rd nymphal stage)
Solvent: acetone 2 parts by weight of the active compound are dissolved in 1000 parts by volume of the solvent. The solution so obtained is diluted with further solvent to the desired concentrations.

2.5 ml of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 10 test insects are then placed in the Petri dish and it is covered with a glass lid.

The condition of the test insects is observed 3 days after the commencement of the experiemnts. the destruction is determined as a percentage.

The active compounds, the concentrations of the active compounds, the test insects and the results can be seen from the following Table 5.

Table 5
(LD$_{100}$ test for Ornithodoros moubata)

| Active compound | Concentration of active compound of the solution in % | Destruction in % |
|---|---|---|
| (A) 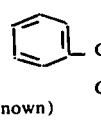 (known) | 0.2 | 60 |
| (1) 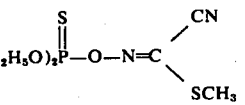 | 0.2<br>0.04 | 100<br>100 |
| (2) 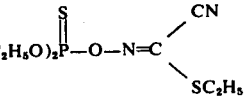 | 0.2<br>0.04 | 100<br>60 |
| (11) 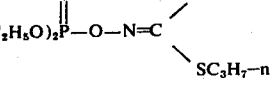 | 0.2<br>0.04 | 100<br>100 |

Table 5-continued
(LD$_{100}$ test for Ornithodoros moubata)

| Active compound | Concentration of active compound of the solution in % | Destruction in % |
|---|---|---|
| (6) 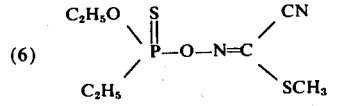 | 0.2<br>0.04 | 100<br>80 |
| (10) 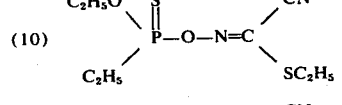 | 0.2<br>0.04 | 100<br>80 |
| (8) 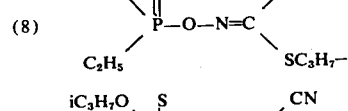 | 0.2<br>0.04 | 100<br>100 |
| (7) 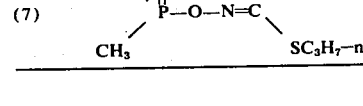 | 0.2<br>0.04 | 100<br>60 |

EXAMPLE 6

Drosophila test
Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

1 cc of the preparation of the active compound is applied with a pipette to a filter paper disc of 7 cm diameter. The wet disc is placed in a glass vessel containing 50 vinegar flies (*Drosophila melanogaster*) and covered with a glass plate.

After the specified periods of time, the destruction is determined as a percentage: 100% means that all the flies are killed; 0% means that none of the flies are killed.

The active compounds, their concentrations, the evaluation times and the degree of destruction can be seen from Table 6.

Table 6
(Drosophila test)

| Active compound | Concentration of active compound in % | Degree of destruction in % after 1 day |
|---|---|---|
| (C) 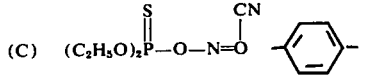 (known) | 0.1<br>0.01<br>0.001 | 100<br>100<br>0 |
| (3) 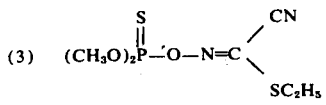 | 0.1<br>0.01<br>0.001 | 100<br>100<br>100 |

Table 6-continued (Drosophila test)

| Active compound | Concentration of active compound in % | Degree of destruction in % after 1 day |
|---|---|---|
| (4) $(CH_3O)_2\overset{S}{\overset{\|}{P}}-O-N=C\overset{CN}{\underset{SC_3H_7i}{}}$ | 0.1<br>0.01<br>0.001 | 100<br>100<br>100 |
| (5) $(CH_3O)_2\overset{S}{\overset{\|}{P}}-O-N=C\overset{CN}{\underset{SC_3H_7}{}}$ | 0.1<br>0.01<br>0.001 | 100<br>100<br>90 |
| (1) $(C_2H_5O)_2\overset{S}{\overset{\|}{P}}-O-N=C\overset{CN}{\underset{SCH_3}{}}$ | 0.1<br>0.01<br>0.001 | 100<br>100<br>75 |
| (6) $\underset{C_2H_5}{\overset{C_2H_5O}{}}\!\!\!\!>\!\!\overset{S}{\overset{\|}{P}}-O-N=C\overset{CN}{\underset{SCH_3}{}}$ | 0.1<br>0.01<br>0.001 | 100<br>100<br>65 |
| (2) $(C_2H_5O)_2\overset{S}{\overset{\|}{P}}-O-N=C\overset{CN}{\underset{SC_2H_5}{}}$ | 0.1<br>0.01<br>0.001 | 100<br>100<br>85 |
| (10) $\underset{C_2H_5}{\overset{C_2H_5O}{}}\!\!\!\!>\!\!\overset{S}{\overset{\|}{P}}-O-N=C\overset{CN}{\underset{SC_2H_5}{}}$ | 0.1<br>0.01<br>0.001 | 100<br>100<br>90 |
| (12) $(C_2H_5O)_2\overset{S}{\overset{\|}{P}}-O-N=C\overset{CN}{\underset{SC_3H_7i}{}}$ | 0.1<br>0.01<br>0.001 | 100<br>100<br>100 |
| (9) $\underset{C_2H_5}{\overset{C_2H_5O}{}}\!\!\!\!>\!\!\overset{S}{\overset{\|}{P}}-O-N=C\overset{CN}{\underset{SC_3H_7 i}{}}$ | 0.1<br>0.01<br>0.001 | 100<br>100<br>98 |
| (11) $(C_2H_5O)_2\overset{S}{\overset{\|}{P}}-O-N=C\overset{CN}{\underset{SC_3H_7}{}}$ | 0.1<br>0.01<br>0.001 | 100<br>100<br>95 |
| (8) $\underset{C_2H_5}{\overset{C_2H_5O}{}}\!\!\!\!>\!\!\overset{S}{\overset{\|}{P}}-O-N=C\overset{CN}{\underset{SC_3H_7}{}}$ | 0.1<br>0.01<br>0.001 | 100<br>100<br>100 |
| (7) $\underset{CH_3}{\overset{iC_3H_7O}{}}\!\!\!\!>\!\!\overset{S}{\overset{\|}{P}}-O-N=C\overset{CN}{\underset{SC_3H_7}{}}$ | 0.1<br>0.01<br>0.001 | 100<br>100<br>99 |

EXAMPLE 7

Tetranychus test

Solvent: 3 parts by weight acetone

Emulsifier: 1 part by weight alkylaryl polyglycol ether

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 7.

Table 7

(Tetranychus test)

| Active compounds | | Concentration of active compound in % | Degree of destruction in % after 2 days |
|---|---|---|---|
| (A) | Ph-C(CN)=N-O-P(S)(OCH$_3$)$_2$ (known) | 0.1<br>0.01 | 100<br>0 |
| (C) | (C$_2$H$_5$O)$_2$P(S)-O-N=C(CN)-C$_6$H$_4$-SCH$_3$ (known) | 0.1<br>0.01 | 100<br>0 |
| (7) | (iC$_3$H$_7$O)(CH$_3$)P(S)-O-N=C(CN)(SC$_3$H$_7$) | 0.1<br>0.01 | 100<br>90 |

EXAMPLE 8

Myzus test (contact action)

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 8.

Table 8

(Myzus test)

| Active compound | | Concentration of active compound in % | Degree of destruction in % after 1 day |
|---|---|---|---|
| (C) | (C$_2$H$_5$O)$_2$P(S)-O-N=C(CN)-C$_6$H$_4$-SCH$_3$ (known) | 0.1<br>0.01 | 100<br>40 |
| (3) | (CH$_3$O)$_2$P(S)-O-N=C(CN)(SC$_2$H$_5$) | 0.1<br>0.01 | 100<br>100 |
| (5) | (CH$_3$O)$_2$P(S)-O-N=C(CN)(SC$_3$H$_7$) | 0.1<br>0.01<br>0.001 | 100<br>100<br>45 |
| (1) | (C$_2$H$_5$O)$_2$P(S)-O-N=C(CN)(SCH$_3$) | 0.1<br>0.01 | 100<br>90 |
| (2) | (C$_2$H$_5$O)$_2$P(S)-O-N=C(CN)(SC$_2$H$_5$) | 0.1<br>0.01 | 100<br>100 |
| (10) | (C$_2$H$_5$O)(C$_2$H$_5$)P(S)-O-N=C(CN)(SC$_2$H$_5$) | 0.1<br>0.01<br>0.001 | 100<br>95<br>45 |

Table 8-continued (Myzus test)

| Active compound | Concentration of active compound in % | Degree of destruction in % after 1 day |
|---|---|---|
| (12) $(C_2H_5O)_2\overset{S}{\overset{\|}{P}}-O-N=C\begin{smallmatrix}CN\\SC_3H_7i\end{smallmatrix}$ | 0.1<br>0.01 | 100<br>99 |
| (9) $\begin{smallmatrix}C_2H_5O\\C_2H_5\end{smallmatrix}\!\!>\!\!\overset{S}{\overset{\|}{P}}-O-N=C\begin{smallmatrix}CN\\SC_3H_7i\end{smallmatrix}$ | 0.1<br>0.01 | 100<br>100 |
| (11) $(C_2H_5O)_2\overset{S}{\overset{\|}{P}}-O-N=C\begin{smallmatrix}CN\\SC_3H_7\end{smallmatrix}$ | 0.1<br>0.01<br>0.001 | 100<br>100<br>50 |
| (8) $\begin{smallmatrix}C_2H_5O\\C_2H_5\end{smallmatrix}\!\!>\!\!\overset{S}{\overset{\|}{P}}-O-N=C\begin{smallmatrix}CN\\SC_3H_7\end{smallmatrix}$ | 0.1<br>0.01 | 100<br>100 |
| (7) $\begin{smallmatrix}iC_3H_7O\\CH_3\end{smallmatrix}\!\!>\!\!\overset{S}{\overset{\|}{P}}-O-N=C\begin{smallmatrix}CN\\SC_3H_7\end{smallmatrix}$ | 0.1<br>0.01 | 100<br>100 |

The process of the present invention is illustrated in and by the following preparative Example.

EXAMPLE 9

(a)         (IIb)

To 62 g (1 mole) of ethylmercaptan in 300 cc of acetonitrile 1 mole of sodium methylate is added, with cooling, and 76 g of chloroacetonitrile are subsequently added at 10 to 15°C. Stirring is afterwards effected for 1 hour at room temperature; 1 mole of sodium methylate is again added, followed by oximation at 0° to 5°C with 80 g of ethyl nitrite. After two days of stirring at room temperature, the liquid is distilled off and the residue is dissolved in 250 cc of water. After clarification with charcoal precipitation is effected with hydrochloric acid and the separating oil is taken up in benzene. The benzene phase is washed with water, dried, and the solvent is distilled off. The residue is purified by so-called "slight distillation". There are obtained 90 g (69 % of theory) of the desired 1-cyano-1-ethyl mercaptoformaldoxime of the refractive index $n_D^{22}$ : 1.5260.

Analogously, the following starting materials are obtained:

| Constitution | Physical properties (refractive index, melting point) |
|---|---|
| (IIa)   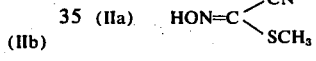 | 56°C |
| (IIc)   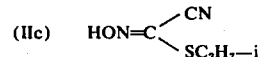 | $n_D^{22}$ : 1.5128 |
| (IId)   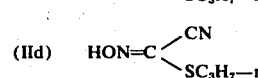 | $n_D^{22}$ : 1.5195 |
| (b)   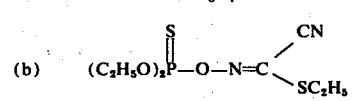 | (2) |

To 39 g (0.3 mole) of 1-cyano-1-ethylmercaptoformaldoxime (Compound II b) in 300 cc of acetonitrile and 45 g of potassium carbonate there are added 57 g of O,O-di-ethylthionophosphoric acid ester chloride; the temperature is effected over night, followed by pouring into 300 cc of water and extraction with 400 cc of benzene. The benzene phase is washed, dried, and the solvent is distilled off. The residue is purified by so-called slight distillation. There are so obtained 69 g (81% of theory) of the desired O,O-diethyl-O-(1-cyano-1-ethylmercaptoformaldoxime)-thionophosphoric acid ester of the refractive index $n_D^{24}$ : 1.5058. Analogously, the following compounds are prepared:

| Constitution | Refractive index | Yield |
|---|---|---|
| (1) $(C_2H_5O)_2\overset{S}{\overset{\|}{P}}-O-N=C\begin{smallmatrix}CN\\SCH_3\end{smallmatrix}$ | $n_D^{23}$ : 1.5143 | 84% |

-continued

| | Constitution | Refractive index | Yield |
|---|---|---|---|
| (3) | (CH₃O)₂P(=S)—O—N=C(CN)(SC₂H₅) | $n_D^{24}$ : 1.5225 | 72% |
| (4) | (CH₃O)₂P(=S)—O—N=C(CN)(SC₃H₇-i) | $n_D^{24}$ : 1.5138 | 75% |
| (5) | (CH₃O)₂P(=S)—O—N=C(CN)(SC₃H₇-n) | $n_D^{22}$ : 1.5159 | 79% |
| (12) | (C₂H₅O)₂P(=S)—O—N=C(CN)(SC₃H₇-i) | $n_D^{20}$ : 1.5034 | 85% |
| (11) | (C₂H₅O)₂P(=S)—O—N=C(CN)(SC₃H₇-n) | $n_D^{25}$ : 1.5047 | 82% |
| (10) | (C₂H₅O)(C₂H₅)P(=S)—O—N=C(CN)(SC₂H₅) | $n_D^{24}$ : 1.5274 | 67% |
| (9) | (C₂H₅O)(C₂H₅)P(=S)—O—N=C(CN)(SC₃H₇-i) | $n_D^{22}$ : 1.5811 | 90% |
| (8) | (C₂H₅O)(C₂H₅)P(=S)—O—N=C(CN)(SC₃H₇-n) | $n_D^{25}$ : 1.5212 | 87% |
| (7) | (iC₃H₇O)(CH₃)P(=S)—O—N=C(CN)(SC₃H₇-n) | $n_D^{25}$ : 1.5140 | 59% |
| (6) | (C₂H₅O)(C₂H₅)P(=S)—O—N=C(CN)(SCH₃) | $n_D^{23}$ : 1.5323 | 80% |

It will be appreciated that the instant specification and examples are set forth by way of illustration and not limitation, and that various modifications and changes may be made without departing from the spirit and scope of the present invention.

What is claimed is:

1. Thionophosphoric(phosphonic) acid ester formaldoximes of the general formula

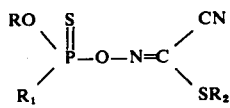

in which
R and R₂ each is an alkyl radical with 1–6 carbon atoms, and R₁ is an alkyl or alkoxy radical with 1–6 carbon atoms.

2. Compounds according to claim 1, in which R and R₂ each is an alkyl radical of 1–4 carbon atoms, and R₁ is an alkyl or alkoxy radical of 1–4 carbon atoms.

3. The compound according to claim 1 wherein such compound is O,O-dimethyl-O-(1-cyano-1-ethylmercaptoformaldoxime)-thiono-phosphoric acid ester of the formula

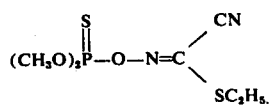

4. The compound according to claim 1 wherein such compound is O,O-diethyl-O-(1-cyano-1-propylmercaptoformaldoxime)-thiono-phosphoric acid ester of the formula

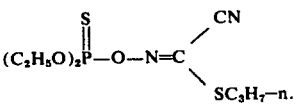

5. The compound according to claim 1 wherein such compound is O-ethyl-O-(1-cyano-1-propylmercaptoformaldoxime)-ethane-thiono-phosphonic acid ester of the formula

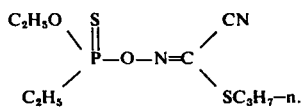

6. The compound according to claim 1 wherein such compound is O-isopropyl-O-(1-cyano-1-propylmercaptoformaldoxime)-methane-thiono-phosphonic acid ester of the formula

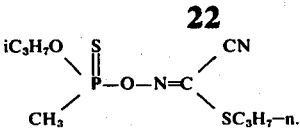

7. The compound according to claim 1 wherein such compound is O-ethyl-O-(1-cyano-1-methylmercaptoformaldoxime)-ethane-thiono-phosphonic acid ester of the formula

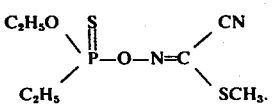

* * * * *